United States Patent
Le (10) Patent No.: US 7,228,619 B2
(45) Date of Patent: Jun. 12, 2007

(54) METHOD OF MANUFACTURING A MAGNETIC HEAD WITH COMMON SEED LAYER FOR COIL AND PEDESTAL

(75) Inventor: Quang Le, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 357 days.

(21) Appl. No.: 10/976,370

(22) Filed: Oct. 29, 2004

(65) Prior Publication Data

US 2006/0092563 A1      May 4, 2006

(51) Int. Cl.
*G11B 5/17* (2006.01)
*G11B 5/187* (2006.01)

(52) U.S. Cl. ............... 29/603.23; 29/603.25; 29/603.12; 29/603.13; 360/123; 360/126; 205/205; 205/119; 427/129; 427/304

(58) Field of Classification Search ............ 29/603.23, 29/603.24, 603.25, 603.27, 603.07, 606, 29/603.12, 603.13, 603.14; 360/122, 123, 360/125, 126; 205/205, 119; 427/129, 304, 427/307
See application file for complete search history.

(56) References Cited

U.S. PATENT DOCUMENTS 6,222,707 B1    4/2001   Huai et al.
6,346,183 B1 *  2/2002   Baer et al. ............ 205/119
6,578,252 B2 *  6/2003   Sasaki .............. 29/603.23 X
2002/0191349 A1  12/2002  Hsu et al.
2002/0191351 A1  12/2002  Santini
2003/0174435 A1   9/2003  Edward et al.
2004/0066576 A1   4/2004  Lee et al.

FOREIGN PATENT DOCUMENTS

JP            2-10508      *    1/1990

OTHER PUBLICATIONS

Williams, E. M., "Monte Carlo Simulation of Thin Film Head Read-Write Performance", IEEE Transactions on Magnetics, vol. 26, No. 6, Nov. 1990, pp. 3022-3026.*

* cited by examiner

*Primary Examiner*—A. Dexter Tugbang
(74) *Attorney, Agent, or Firm*—G. Marlin Knight (57) ABSTRACT

A method for fabricating a coil and pedestal for a write head using a common seed layer is described. A nonmetallic gap layer is deposited on a planarized pole piece surface. Openings for the pole piece pedestal and the back gap pole piece are etched through the nonmetallic gap layer. A seed layer comprising a magnetic material is deposited on the etched gap layer. Preferably the coil is fabricated first on the planar surface of the seed layer. The coil structure, the pedestal pole piece, back-gap pole piece, side and center tap connections are fabricated on the same seed layer. The remaining seed layer is removed, the coil is encapsulated, the wafer is refilled with alumina and the wafer is planarized. The prior art process can be resumed at this point. Optionally a second seed layer such as copper (Cu) can be used.

7 Claims, 7 Drawing Sheets

METHOD OF MANUFACTURING A MAGNETIC HEAD WITH COMMON SEED LAYER FOR COIL AND PEDESTAL

FIELD OF THE INVENTION

The invention relates to the field of magnetic transducers (heads) having inductive write heads and more particularly to the structure of and the process for making the pole pieces and coil for the write head.

BACKGROUND OF THE INVENTION

Figure 1:
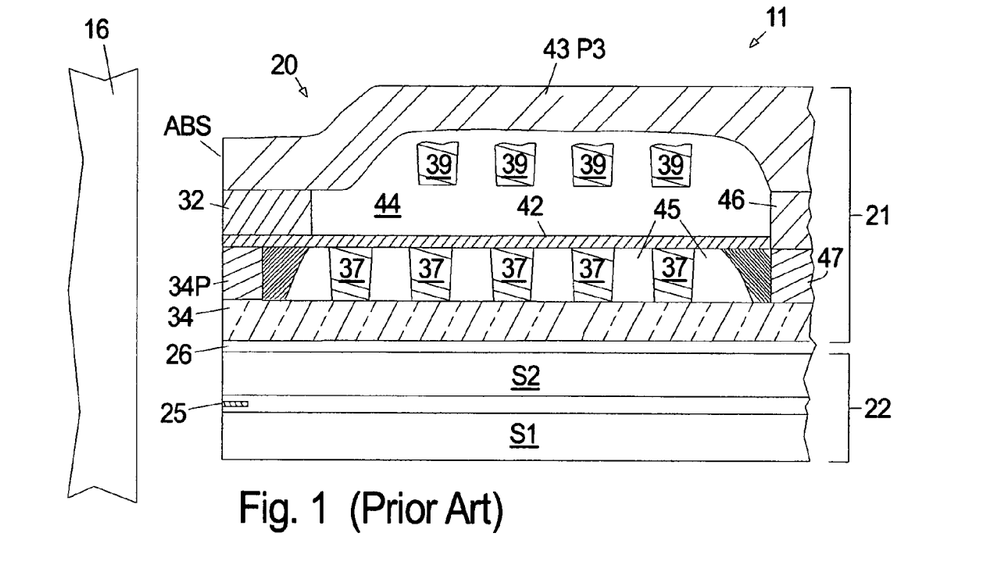
FIG. 1 is an illustration of the relationship between the head and the disk in a prior art disk drive. The view is a section taken perpendicular to the ABS of the head and the surface of the disk. The head is designed for longitudinal recording.

A magnetic disk recording system 11, shown in FIG. 1, includes a thin film magnetic transducer 20 and a disk 16 with magnetic thin films formed thereon. The disk 16 is rotated under the transducer 20 which writes and reads magnetic domains in ferromagnetic material on the disk. The read and write head portions of the transducer (also called a head or slider) are built-up in layers using thin film processing techniques. In the typical process of fabricating thin film magnetic heads, a large number of heads are formed simultaneously on a wafer. After the basic structures are formed the wafer is cut into rows or individual sliders. The exposed edges of the thin film are further processed to become the ABS of the slider. The protective overcoat which is normally formed over the slider components on the ABS is not shown. The magnetic sensor can be any one of various types including tunnel-junction (TMR) and spin valves (GMR). The magnetic transducer 20, shown in FIG. 1 is composed of elements that perform the task of writing magnetic transitions (the write head 21) and reading the magnetic transitions (the read head 22). The components of the read head 22 are the first shield (S1), the sensor element 25 and the second shield (S2). Separation layer 26 separates S2 from P1 and contributes to the spacing between the read head 22 and the write head 21. The yoke in the write head 21 includes three pole pieces P1 34, P2 32 and P3 43. P1 has a pedestal pole piece 34P. The P2 32 confronts the P1P 34P across the write gap layer 42 to form the write gap at the ABS. Typically write heads only have one coil layer 37, but two or more coil layers 37, 39 are possible. The P3 43 arches over the resist mound 44. Small tips (not shown) are formed on the pedestal and P2 to confront each other across the gap layer 42.

At various stages during the fabrication process chemical-mechanical polishing (CMP) is used to planarize the wafer, achieve desired thicknesses of features. For example, CMP is used to planarize the surfaces of S1, P1, P1P, and P2. Features are typically formed on the wafer by plating through photolithography masks and followed by deposition of refill material over the wafer. CMP is used to planarize the wafer after the refill deposition. The active components in magnetic heads are typically metals such as copper, NiFe, CoFe and CoNiFe. The refill material is typically alumina. The slurry used for CMP conventionally includes an abrasive such as silica or alumina, surfactants, corrosion inhibitors and etchants. Conventionally in preparation for planarization the material for a head component such as shield and pole pieces are deposited significantly thicker than the final target value. Similarly the refill material is also deposited significantly above the final. When the CMP is executed the excess material is removed.

Figure 2:
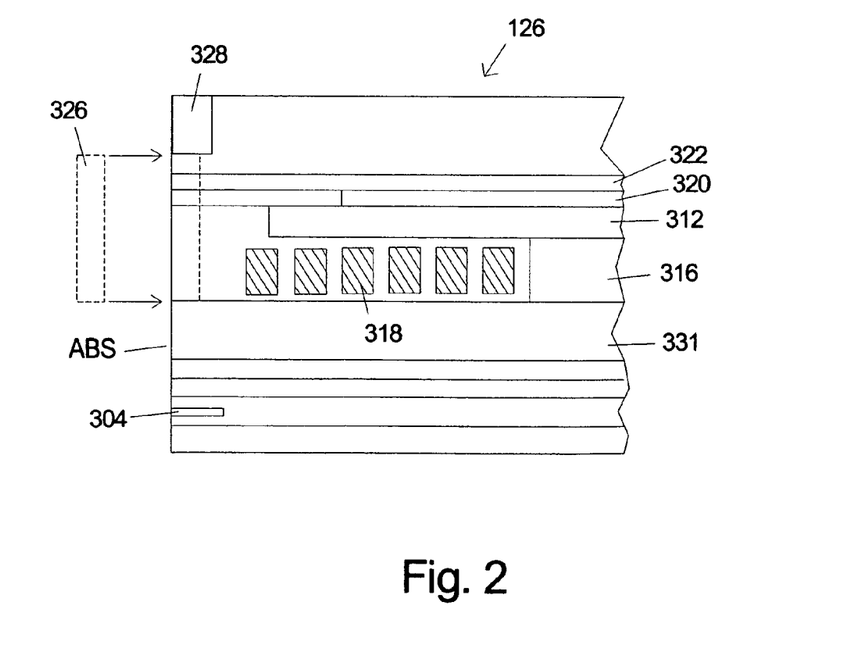
FIG. 2 is an illustration of a head designed for perpendicular recording. The view is a section taken perpendicular to the ABS of the head and the surface of the disk.

FIG. 2 is a symbolic illustration of a section of a head 126 for perpendicular recording. The section is taken perpendicular to the ABS. This figure and the others included herein are not to scale, in part because the smaller components and spacings would be unclear. This design has a single coil 318. The yoke is composed of ferromagnetic pole pieces 331, 312, 316, 310. The trailing shield 328 can also be considered a pole piece. This design includes a pair of studs 326 shown in dotted lines, since they do not appear in the midline cross-section, but rather flank the pole tips as viewed from the ABS on the left and right and connect the first pole piece 331 to the trailing shield 328. The sensor is element 304. The nonmagnetic metal gap layer is 322. Element 320 is an insulator layer. An alternative perpendicular head design can include a pedestal (not shown). When a pedestal is included the studs are not used. The pedestal in this alternative will be substantially similar to the one shown in FIG. 1 for the longitudinal head.

With the increasing demand to reduce cost for manufacturing magnetic recording heads has correspondingly fueled the challenge to find new materials and innovative techniques aimed toward fabricating critical head structures with reduce number of process steps and achieve higher yields. One area of focus in the head design is the order in which the first coil and pedestal are fabricated. Although the role of the pedestal and its position in a longitudinal head is important in optimizing the write bubble, it is more flexible in perpendicular recording. Some single pole concept designs for perpendicular recording do not incorporate a pedestal. Recent evaluation of experimental single pole designs indicates corner writing of the return pole caused by flux saturation stemming from external fields and/or from the flux guide layer coupling to the soft-underlayer (SUL) and amplifying back to the return pole. Therefore, use of a pedestal into a perpendicular head design may provide improvements.

In current approaches the first coil can be fabricated before or after the pedestal. There can be two or more coils layers. The design in which a coil is fabricated before the pedestal will be called the "bionic" design and the design in which a pedestal is fabricated before the first coil will be called the planar design.

With the bionic design, the coil structure is fabricated on a CMP polished surface separated by an insulating gap and encapsulated with hard bake resist then the pedestal and back-gap structures are built 46, 47. The major advantage of this technique is that the coil is built on a lithographically favorable surface whereby resist uniformity and lithography scattering effects are tightly controlled to achieve excellent within wafer and wafer-to-wafer critical dimensions (CD) and overlay reproducibility. In addition, this approach offers a vehicle to scale the coil pitch towards smaller dimension. The major disadvantage at this process is it requires two bard bake steps: the first encapsulates the coil for pedestal and back-gap fabrication (E1) and the second encapsulates with additional hard bake to seal the hard bake within the pedestal and back-gap pocket (EF).

In the planar design, the pedestal and back-gap structure 47 are simultaneously fabricated by a through-mask plating approach and encapsulated with an insulator such as alumina followed by deposition of the coil seed-layer and subsequent coil fabrication. The coil seed layer is removed by ion milling and the coil structure is encapsulated with hard bake resist in the pedestal and back-gap pocket (E1). The major advantage or this technique is that it uses only one hard bake step. The major drawback to this technique as compared to the bionic design is that it requires the modification of the coil structure for higher pitch coil to compensate for the non-uniformity of the resist profile and attenuation of lithography light scattering effects due to the present of the pedestal and back-gap during coil fabrication. Although the benefit of this technique removes an additional hard bake step, it limits the extendibility of the coil process toward the narrow coil pitch which is needed.

In US patent application 2003/0174435 by Dinan, et al., a method for aligning a coil for an inductive head structure using a patterned seed layer is disclosed. The invention uses an alignment process where the base plate imprint is fabricated on an electrically insulating layer and the reversed image is fabricated and etched into the coil insulation material, e.g., hard bake photoresist to alleviate the problems associated with complete ion removal of the seed layer between high aspect ratio coils.

In US patent application 2004/0066576 by Lee, et al. a magnetic write head having a vertically laminated back gap structure is disclosed. The magnetic head is formed with lower and upper pole pieces and a back gap structure which connects the lower and the upper pole pieces in a back gap region. In one illustrative example, the back gap is a vertically laminated structure having alternating layers of magnetic and non-magnetic materials. Each alternating layer is perpendicular to both the lower and the upper pole pieces. This vertically laminated structure significantly reduces the eddy currents in the back gap region at high operating frequencies as the layers are oriented in a direction parallel with the magnetic flux.

In US patent application 20020191351 by Hugo Santini a method of making a magnetic write head includes forming a strip of negative photoresist on a wafer at an ABS site with a width that defines a track width of the write head and which has a height above a desired height of a second pole tip. An alumina layer is formed on the wafer and on the strip with a thickness above the wafer that is equal to or greater than a desired height of the second pole tip. The alumina layer is then mechanically polished until the negative photoresist strip is exposed. The negative photoresist strip is then removed leaving an opening in the alumina layer after which the second pole tip is formed in the opening. In a first embodiment of the invention the second pole tip and the second pole piece yoke are one piece and are planar and in a second embodiment of the invention a P2 yoke is stitched to the second pole tip. In both embodiments the first pole piece of the write head can be notched without damaging the second pole tip.

In US patent application 20020191349 by Hsu, et al., a magnetic head assembly includes first and second pole pieces and first and second coil layers. In a first embodiment the second pole piece structure is a single layer and in a second embodiment the second pole piece structure has front and back components with a flat laminated second pole piece yoke layer located there between. In addition to the first pole piece layer, the first pole piece of the write head includes a pedestal, which is located at and forms a portion of the ABS, and a back gap component which is located at the back gap. Between the pedestal and the back gap component is located a dielectric insulation layer which is located on the first pole piece layer. On the insulation layer is a first write coil layer which is also located between the pedestal and the back gap component. An insulation layer insulates the turns of the write coil from one another as well as insulating the write coil from the pedestal and the back gap component. In a preferred embodiment the insulation layer 207 includes a hard baked photoresist film 208 which insulates the write coil 206 between its turns and an alumina layer 210 which further insulates the write coil from the pedestal and the back gap component. At this stage the write head is planarized so that the pedestal, the back gap component, the write coil, the hard baked photoresist and the alumina layer form a first coplanar surface. The first coplanar surface has a middle region which is located between front and back gap regions. A write gap layer extends over the entire wafer except at the back gap component.

SUMMARY OF THE INVENTION

A method for fabricating a coil and pedestal for a write head using a common seed layer is described. Embodiments of the invention can be used for perpendicular or longitudinal heads. A nonmetallic gap layer is deposited on a planarized first pole piece surface (P1 or the return pole piece). Openings for the pole piece pedestal and the back gap pole piece are etched through the nonmetallic gap layer. A seed layer comprising a magnetic material is deposited on the etched gap layer. Preferably the coil is fabricated first on the planar surface of the seed layer. The coil structure, the pedestal pole piece, back-gap pole piece, side and center tap connections are fabricated on the same seed layer. Preferably the magnetic material for the seed layer is NiFe. Since NiFe and copper both have FCC crystal structure, good adhesion of the copper coil should be achieved. The remaining seed layer is removed after all of the structures below the gap have been formed. The coil is then encapsulated, the wafer is refilled with alumina and planarized. The advantage of this method is extendibility towards tighter pitch coil, uses only one hard bake step and concurrent continuous electrical connections are brought up to the back-gap and pedestal level. Pedestal, back-gap, and electrical connections are brought up to the same planarized level in one step. The prior art fabrication methods are resumed at this point. Optionally a second seed layer such as copper (Cu) can be deposited on the magnetic seed layer. Use of the copper seed layer can require that an additional wet etch which is selective for copper removal be performed after the mask for the deposition of the pedestal and back gap pole piece is patterned.

DETAILED DESCRIPTION OF THE INVENTION AND THE PREFERRED EMBODIMENTS

It is conventional for thousands of heads to be manufactured simultaneously on a single wafer. For simplicity the following will describe the actions or structures for a single head, but it is to be understood that unless noted otherwise the process steps are performed over the entire wafer and are, therefore, forming structures for thousands of heads simultaneously. The invention relates to the write head portion of the magnetic transducer and does not place limits on the type of read head that can be used with it. Typically the read head portion of the transducer is fabricated first, but transducers with the write head portion fabricated first have been described in the prior art. A write head according to the invention may be fabricated before or after the read head portion of the transducer. The invention can also be used in either longitudinal or perpendicular write heads if a pedestal is included in the design. In addition, perpendicular heads can also include studs (or pillars) that have some similarities to pedestals and the method of the invention can be used to make these structures as well.

The relative sizes of the components shown in the figures are not presented according to scale, since the large range of sizes would make the drawing unclear. The relative sizes/thickness of the components are according to prior art principles except where noted below. The hatching lines are not intended to represent the material composition of a structure, but are used only to distinguish structures and aid in the explanation of the process of making the write head.

Figure 3:
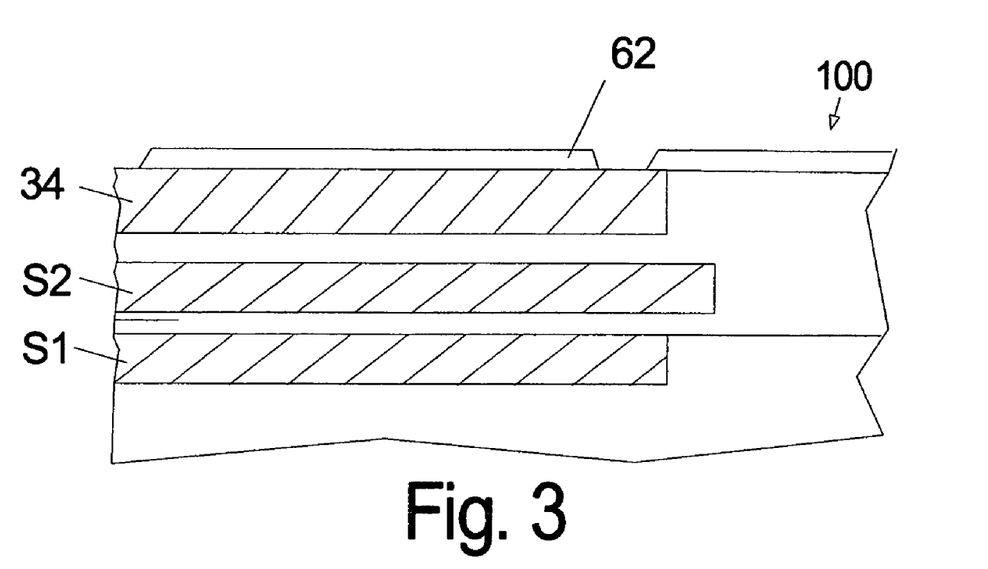
FIG. 3 is section view of a wafer on which heads according to the invention are being manufactured. The section is taken perpendicular to the surface of the wafer. The state of the process is just after the nonmetallic gap layer has been deposited over the P1 or return pole piece.

Reference is made to FIG. 3 to begin a description of an embodiment of the method of the invention. The prior art read head has been formed first on the wafer 100. The first pole piece P1 34 for the write head has been formed and the surface planarized. The nonmetallic gap layer 62 has been deposited on the planarized surface of P1. Using standard thin film photolithography techniques, voids have been etched in the gap layer to expose two areas of P1 for formation of the pedestal and back gap pole pieces.

Figure 4:
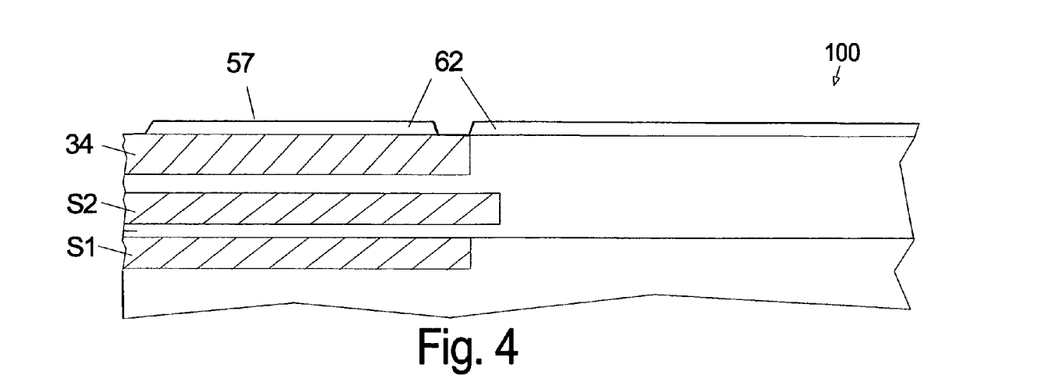
FIG. 4 is section view of the wafer of FIG. 3 after deposition of the seed layer according to the invention.

FIG. 4 illustrates the process a stage subsequent to that of FIG. 3 after the seed layer 57 has been deposited according to the invention. The seed layer 57 is a magnetic material such as NiFe which is suitable for electroplating the magnetic material for the pedestal and back gap. The seed layer 57 is deposited by a thin film deposition technique such as sputtering which produces a film that conforms to the topography of the etched gap layer. An alternative embodiment uses a bi-layer seed layer consisting of NiFe followed by a layer of Cu. This option could have improved adhesion for the coil structure over a NiFe seed layer. If the adhesion is inadequate when using the NiFe seed layer, this option should be used.

Figure 5:
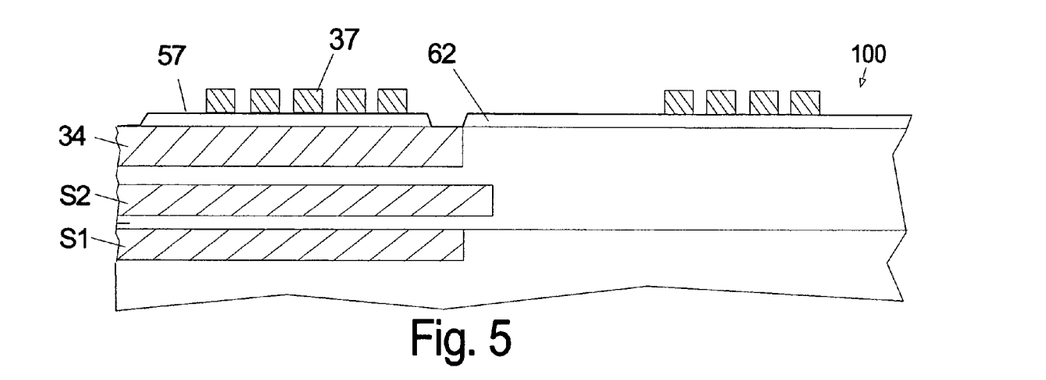
FIG. 5 is section view of the wafer of FIG. 4 after the fabrication of the coil according to a first embodiment the invention.
Figure 6:
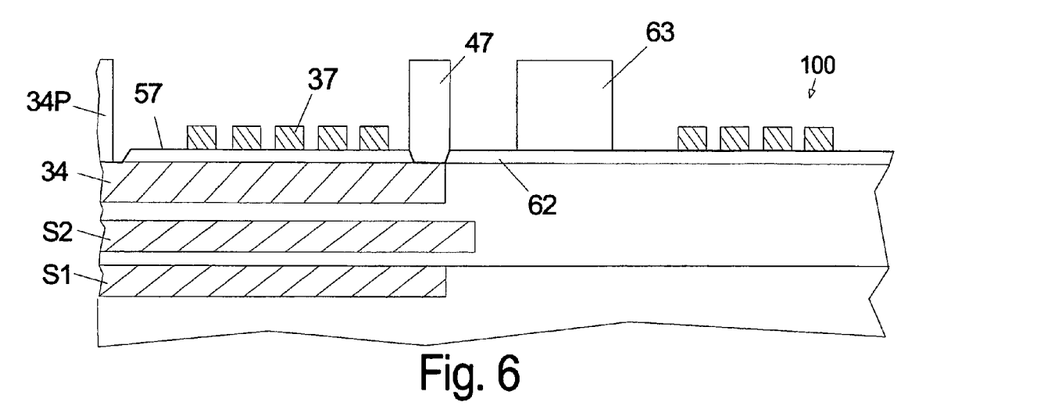
FIG. 6 is section view of the wafer of FIG. 5 after the fabrication of the pedestal according to a first embodiment the invention.

The process continues in FIG. 5 which shows the coil 37 which has been fabricated on the seed layer 57 using standard techniques. FIG. 6 shows the pedestal 34P, the back gap pole piece 47 and the center tap connection 63 for the coil. The pedestal 34P and the back gap pole piece 47 are fabricated using standard materials and techniques from magnetic material such as NiFe. The NiFe for these components is typically deposited by electroplating. The center tap connection 63 is also made according to standard techniques and is typically copper which is also electroplated.

At this stage of the process the seed layer 57 has been used for the coil, the center tap, backgap pole piece and pedestal. Therefore, the seed layer material under pedestal is the same as the seed layer under the coil. The seed layer material between the structures is removed at this stage by a removal technique such as sputter etching or ion milling which will remove NiFe and copper if present. The seed layer material is electrically conductive, so it must be completely removed between the turns of the coil to leave only the nonmetallic gap layer material.

Figure 7:
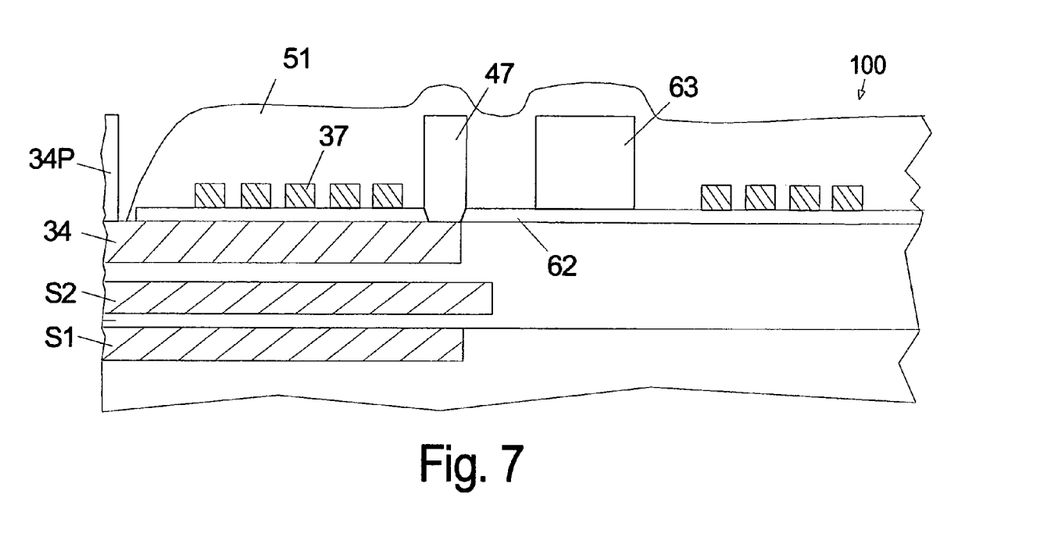
FIG. 7 is section view of the wafer of FIG. 6 after the removal of the seed layer and encapsulation of the coil according to a first embodiment the invention.
Figure 8:
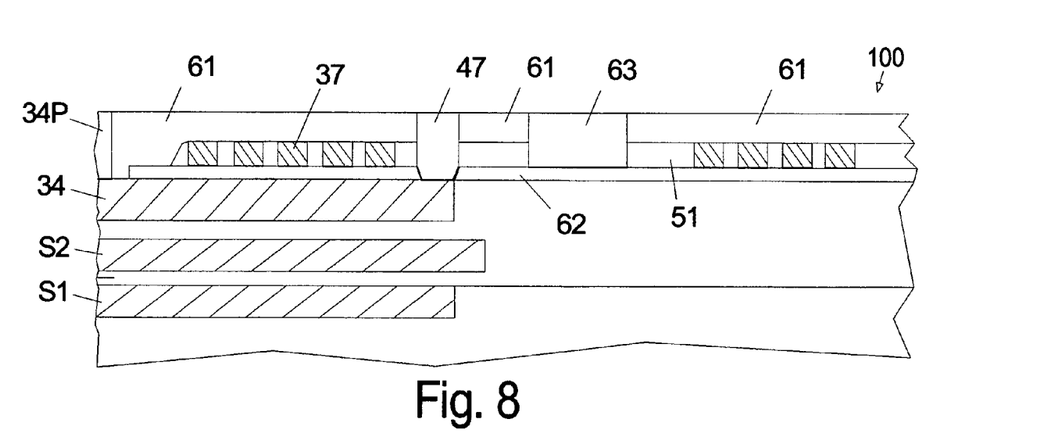
FIG. 8 is section view of the wafer of FIG. 7 after refilling and planarization according to a first embodiment the invention.
Figure 9:
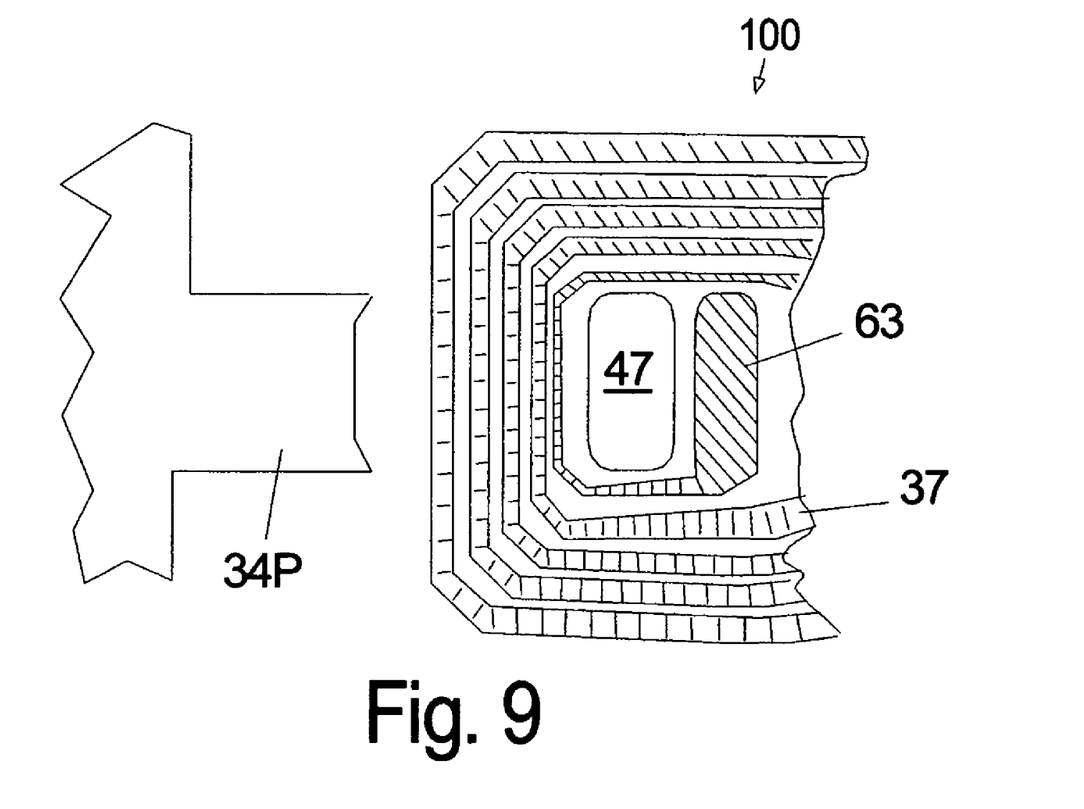
FIG. 9 is a plan view of the pedestal and coil of FIG. 8 according to a first embodiment the invention.

FIG. 6 illustrates the state of the subsequent to removal of the excess seed layer and the encapsulation of the coil in hard bake 51. In an alternative embodiment reaction-ion etching (RIE) can be used to thin the hard bake. The hard bake remaining in FIG. 7 illustrates the effect of the RIE. After the hard bake has been processed, the wafer is refilled with a nonmetallic material such as alumina 61 and then planarized to expose the tops of the pedestal 34P, the back gap pole piece 47 and the center tap connection 63 for further processing. In the finished head three pads of the common seed layer remain. There is a pad of seed layer material between the pedestal and the first pole piece. There is a pad of seed layer material between the back gap pole piece and the first pole piece. There is a continuous spiral pad of seed layer material under the copper for the coil and the center tap. The plan view of the common seed layer after the unused areas have been removed is determined from FIG. 9. FIG. 9 shows the plan view of the pedestal 34P, back gap pole piece 47, coil 37 and coil center tap 63. Since each of these structures has the remaining common seed layer under it, their totality is the remaining common seed layer. The remainder of the write head can be completed according to the prior art.

Figure 10:
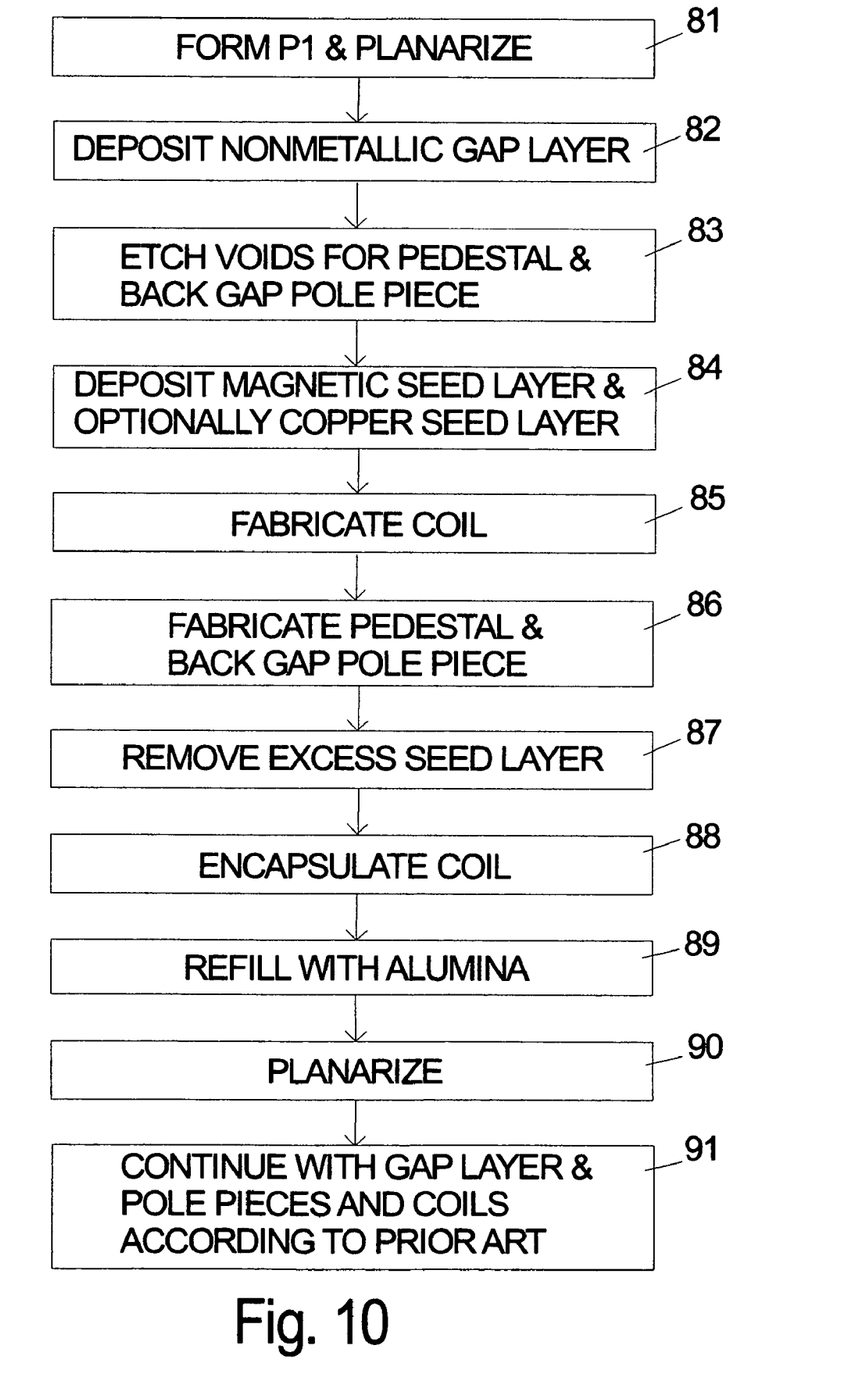
FIG. 10 is a flowchart of the steps in a method according to a first embodiment the invention.

FIG. 10 is a flowchart of a first embodiment of the method of the invention. The first pole piece is fabricated and planarized 81. The nonmetallic gap layer is deposited 82. The voids for the pedestal and back gap pole piece are etched through the nonmetallic gap layer 83. The magnetic seed layer and optionally a top layer of a copper seed layer are deposited over the wafer 84. The seed layer(s) will be deposited in the voids, as well as, on the remaining nonmetallic gap layer. The coil is fabricated on the seed layer at this point 85. The pedestal and back gap pole piece are fabricated 86. The prior art subprocess which is used to fabricate the pedestal and back gap pole piece includes several steps which will be discussed more fully below, but in this embodiment the optional copper seed layer must be thin enough so that a negligible amount of copper will be after the ashing step which is used to prepare the wafer for electroplating the NiFe for the pedestal and back gap pole piece. Since the Cu seed layer is only used to increase adhesion of the copper coil material, it can be made very thin, so that the ashing step will oxidize copper to CuO. The dwell time before plating will remove CuO. Preferably there should be no copper under the pedestal or backgap pole piece, but magnetic performance might not be significantly affected by a small amount of copper if it is sufficiently thin and the plated area of the magnetic material is large enough.

After the pedestal and back gap pole piece have been completed the remaining seed layer around the turns of the coils is removed 87. The coil is encapsulated in hard-bake 88. The wafer is refilled with alumina 89. The wafer is planarized 90. The prior art process is used to complete the head starting with the deposition of the gap layer followed by the fabrication of additional coils and pole pieces 91.

Figure 11:
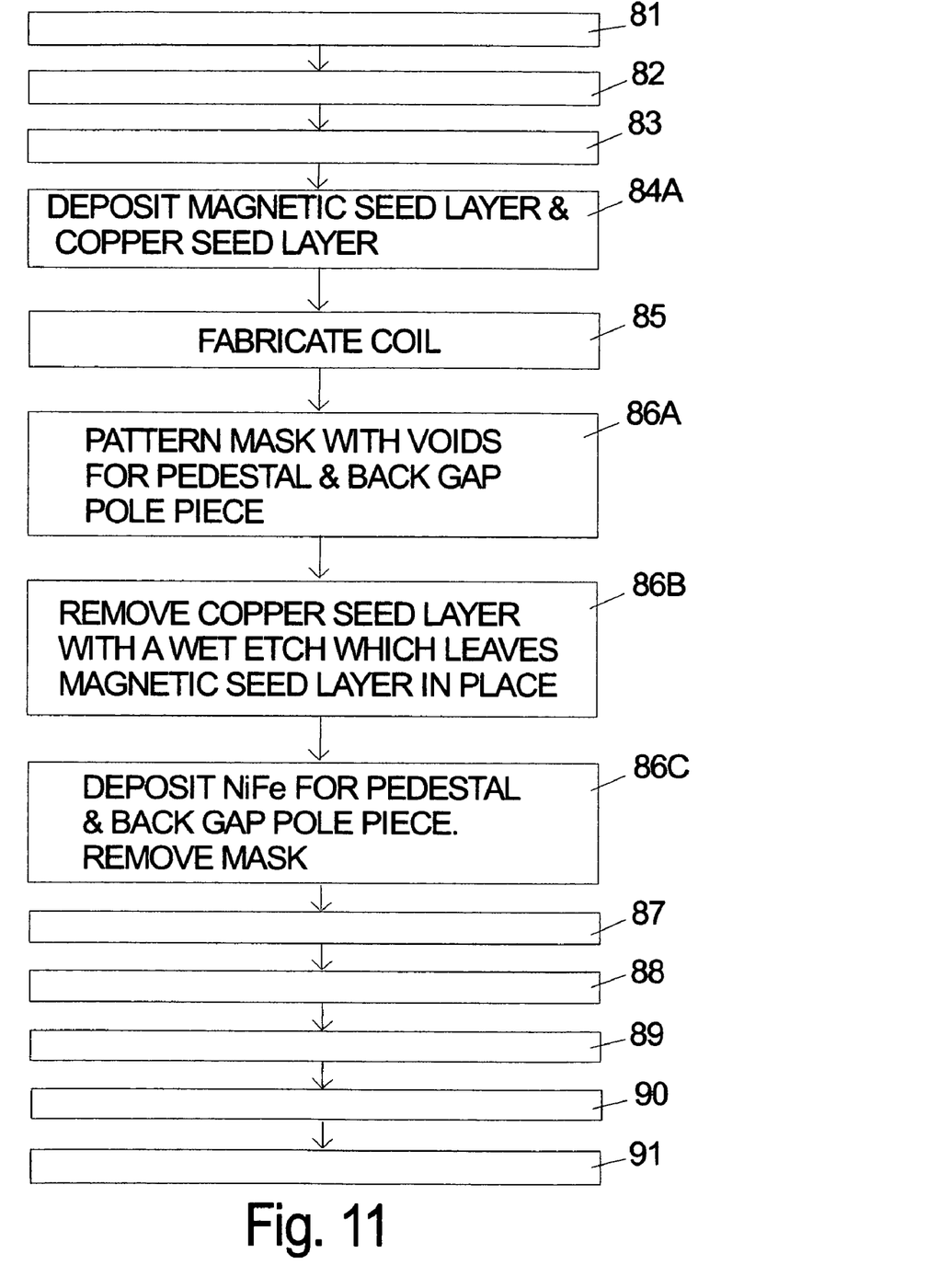
FIG. 11 is a flowchart of the steps in a method according to a second embodiment the invention.

In the alternative embodiment which uses a thin film layer of copper on the magnetic seed layer which is not sufficiently removed by the prior art ashing step in the process for fabricating the pedestal and the back gap pole piece, an additional step is added to the method to remove the copper seed layer from the voids where these magnetic structures will be formed. FIG. 11 will be used to describe this alternative method. The steps which are the same as shown in FIG. 10 have been repeated with only the reference number to save space. In this embodiment the copper seed layer is not optional, so the magnetic seed layer is deposited and then the copper is deposited 84A. The coil is fabricated as before 85. The mask for the pedestal and back gap pole piece fabrication is patterned with voids where the pedestal and back gap pole piece are to be located 86A. The copper seed layer will be the top layer in these voids. The wafer is subjected to a wet etch step to remove copper in those open areas prior to NiFe plating 86B. The etchant must be selected to remove copper, but not to attack the resist mask or the NiFe seed-layer under the copper. One suitable etchant is a mixture ammonium persulfate, ammonium hydroxide, and water. After the copper has been removed from the voids, the underlying NiFe seed layer is exposed. The magnetic material for the pedestal and back gap pole piece is deposited and the mask is removed 86C. The remaining steps are the same as for the embodiment described above.

In an alternative embodiment the pedestal and back gap pole piece can be fabricated prior to the coil. The common seed layer of the invention is still used in this embodiment. It is preferable to fabricate the coil first, however, since it is the more critical or fragile structure and benefits most from being fabricated on the fresh seed layer or the planarized surface of the nonmetallic gap layer. If the pedestal and back gap are fabricated first, the surface of the seed layer where the coil is formed will be subjected to photoresist deposition and removal which potentially can make the surface less ideal. The scalability of the coil pitch might also be a problem if the pedestal and backgap are fabricated first. The structure of the pedestal and backgap pole piece will cause the coil resist profile to not be as smooth for fabricating the coil. Scattering effects from the proximity of pedestal and backgap pole piece structure can affect the resolution of the coil image. These factors will make fabricating tighter coil pitch more difficult.

Other variations and embodiments according to the invention will be apparent to those skilled in the art which will nevertheless be with the spirit and scope of the invention.

What is claimed is:

1. A method of fabricating a thin film magnetic head on a wafer comprising the steps of:

planarizing a surface of the wafer after fabricating a first pole piece for a write head to form a planarized surface of the first pole piece;

depositing a nonmetallic gap layer on the planarized surface of the first pole piece;

etching first and second voids in the nonmetallic gap layer to expose selected areas of the first pole piece for a pedestal and a back gap pole piece;

depositing a thin film seed layer material over the nonmetallic gap layer and the first and second voids, the thin film seed layer material including at least a first seed layer of a magnetic material;

fabricating a coil and center tap for the coil for the magnetic head on the thin film seed layer material;

fabricating the pedestal and the back gap pole piece on the thin film seed layer material in the first and second voids respectively;

removing the seed layer material that is left exposed after the steps of fabricating the coil, pedestal and the back gap pole piece;

encapsulating the coil in an insulating material;

refilling the wafer by depositing a nonmetallic material; and planarizing the wafer to expose the pedestal, back gap and center tap for the coil in preparation for deposition of a gap layer.

2. The method of claim 1 wherein the thin film seed layer material includes a second seed layer of copper deposited after the first seed layer of the magnetic material.

3. The method of claim 2 wherein the step of fabricating the pedestal and the back gap pole piece further includes an ashing step which removes the second seed layer of copper in the voids.

4. The method of claim 2 wherein the step of fabricating the pedestal and the back gap pole piece further includes patterning a mask with openings at the first and second voids; using a selective wet etchant to remove the second copper seed layer and leave the first seed layer of magnetic material in the voids.

5. The method of claim 4 wherein the selective wet etchant includes ammonium persulfate and ammonium hydroxide.

6. The method of claim 1 wherein the step of encapsulating the coil in an insulating material further comprises depositing a layer of hard bake resist over the coil and then thinning the hard bake resist using reactive-ion etching.

7. The method of claim 1 wherein the step of removing the seed layer material further comprises using sputter etching or ion milling to remove the seed layer material.

* * * * *